US012687173B2

(12) United States Patent
Pan et al.

(10) Patent No.: US 12,687,173 B2
(45) Date of Patent: Jul. 21, 2026

(54) FISH GUIDE DEVICE FOR PUMP AND AXIAL FLOW PUMP/TUBULAR FLOW PUMP STATION

(71) Applicant: Jiangsu University, Jiangsu (CN)

(72) Inventors: Qiang Pan, Jiangsu (CN); Desheng Zhang, Jiangsu (CN); Weidong Shi, Jiangsu (CN); Linlin Geng, Jiangsu (CN); Xi Shen, Jiangsu (CN)

(73) Assignee: Jiangsu University, Jiangsu (CN)

( * ) Notice: Subject to any disclaimer, the term of this patent is extended or adjusted under 35 U.S.C. 154(b) by 273 days.

(21) Appl. No.: 18/711,114

(22) PCT Filed: Dec. 12, 2023

(86) PCT No.: PCT/CN2023/138102
§ 371 (c)(1),
(2) Date: May 17, 2024

(87) PCT Pub. No.: WO2025/097540
PCT Pub. Date: May 15, 2025

(65) Prior Publication Data
US 2026/0168508 A1      Jun. 18, 2026

(30) Foreign Application Priority Data
Nov. 10, 2023    (CN) .......................... 202311495209.5

(51) Int. Cl.
| *F04D 29/18* | (2006.01) |
| *A01K 63/04* | (2006.01) |
| *F04D 3/00* | (2006.01) |

(52) U.S. Cl.
CPC .......... *F04D 29/181* (2013.01); *A01K 63/047* (2013.01); *F04D 3/00* (2013.01)

(58) Field of Classification Search
CPC .................................................... A01K 63/047
See application file for complete search history.

(56) References Cited

U.S. PATENT DOCUMENTS

| 3,940,867 | A | * | 3/1976 | Sikich | .................... A01K 79/00 43/6.5 |
| 4,193,737 | A | | 3/1980 | Lemmon | |

FOREIGN PATENT DOCUMENTS

| CH | | 394814 | A | * | 6/1965 | ............. A01K 79/00 |
| CN | | 102885013 | | | 1/2013 | |

(Continued)

OTHER PUBLICATIONS

"International Search Report (Form PCT/ISA/210) of PCT/CN2023/138102", mailed on Feb. 28, 2024, pp. 1-4.

*Primary Examiner* — Magdalena Topolski
(74) *Attorney, Agent, or Firm* — JCIPRNET

(57) ABSTRACT

The present disclosure provides a fish guide device for a pump. An axial flow pump blade is located in a runner chamber. A fish guide ring mounted on a wall surface of the runner chamber is arranged at an inlet of the axial flow pump blade. A fish guide cap is mounted on a hub of the axial flow pump blade. A plurality of jet holes are provided on the fish guide ring, to form a jet to guide fish to the fish guide cap. A plurality of fish guide grooves are provided on a surface of the fish guide cap. The present disclosure allows the fish to enter a flow channel of an axial flow pump. This can improve the survival rate of fish and allow the fish to smoothly pass through the axial flow pump.

21 Claims, 9 Drawing Sheets

(56)     References Cited

FOREIGN PATENT DOCUMENTS

| | | | | |
|---|---|---|---|---|
| CN | 103583473 | | 2/2014 | |
| CN | 103598158 | | 2/2014 | |
| CN | 104613001 | | 5/2015 | |
| CN | 105145463 | | 12/2015 | |
| CN | 106015013 | | 10/2016 | |
| CN | 106472440 | | 3/2017 | |
| CN | 206017251 U | * | 3/2017 | |
| CN | 109667787 | | 4/2019 | |
| CN | 111165444 | | 5/2020 | |
| CN | 111664114 A | * | 9/2020 | ........... F04D 29/181 |
| CN | 114909300 | | 8/2022 | |
| SU | 861741 | | 9/1981 | |

* cited by examiner

B–B

C–C

45°            90°            135°

45°    67.5°    90°    112.5°    135°

FISH GUIDE DEVICE FOR PUMP AND AXIAL FLOW PUMP/TUBULAR FLOW PUMP STATION

CROSS-REFERENCE TO RELATED APPLICATION

This application is a 371 of international application of PCT application serial no. PCT/CN2023/138102, filed on Dec. 12, 2023, which claims the priority benefit of China application no. 202311495209.5, filed on Nov. 10, 2023. The entirety of each of the above-mentioned patent applications is hereby incorporated by reference herein and made a part of this specification.

TECHNICAL FIELD

The present disclosure relates to the technical field of fluid machinery, and in particular, to a fish guide device for a pump and an axial flow pump/tubular flow pump station.

BACKGROUND

Axial flow pumps have the characteristics of high flow rate, low head, high efficiency, small size, and low construction costs. Thus, axial flow pumps are widely used in pumping station construction projects for water diversion, flood control and drainage, and agricultural irrigation. However, as the core power "heart" of large pumping station groups, the axial flow pump has a high rotating speed, causing high impact damage to creatures passing through the station. The high-speed rotating impeller blades of the axial flow pump, like knife blades, cut the creatures, which is very likely to cause large-scale death of the creatures (such as fish and shrimp) in rivers and lakes, hindering their migration. Since 2005, the Netherlands has monitored fish damage and death in more than 20 pumping stations and found that more than 60% of fish died after passing through axial flow pumping stations. This proportion was much greater than those of mixed-flow pumps and centrifugal pumps. Therefore, improving the safety of fish passing through pumps is an urgent ecological problem to be solved in axial flow pumping stations, and is also the development direction of ecological water conservancy strategies.

Patent Application No. ZL201510007615.1 proposes an eco-friendly axial flow pump structure allowing fish to pass through. This structure mainly optimizes the shape of the axial flow pump blades, to reduce the probability of the blades impacting fish and reduce the mortality of fish impacted by the blades. This scheme fails to make improvements regarding the source of impact, i.e., reduce the mortality of fish impacted by the front edge of the blade. Patent Application No. ZL201610586021.5 proposes a fish-friendly shaftless axial flow pump. This device does not include the rotating shaft of a conventional axial flow pump, a channel is formed in the center of the entire device, and the rotation of the axial flow impeller is driven by a belt pulley outside the impeller edge. In this patent, to ensure that fish can pass through the channel of the bladeless zone in the center, a conical surface-shaped scoop net is mounted upstream the impeller. When the axial flow pump operates, the conical surface-shaped scoop net plays a converging role, and fish is driven by water to pass through the bladeless zone in the center of the impeller and the guide vane, i.e., the "shaftless" part, so that the life safety of fish and other creatures in rivers and seas can be protected. However, compared with conventional axial flow pumps, the device has a more complex structure and higher construction costs. The transmission efficiency highly affects the overall operating efficiency and stability of the pump system. The scoop net increases the resistance to water flow and reduces the hydraulic performance. The grid block size of the scoop net also determines that the scoop net cannot protect small fish. patent application No. 201811520413.7 proposes a radial-flow fish pump impeller and a radial-flow fish pump. In this patent, the area of the flow cross-section at the corner of the centrifugal pump impeller is increased by increasing the radius of the transition arc between the front cover and the back cover of the impeller, allowing more fish and shrimp to pass through. The core idea of this patent is to provide a "larger" flow channel area to prevent fish and shrimp from being blocked in the flow channel, and is more suitable for use in the field related to non-clogging pumps. However, this patent fails to take preventive and improvement measures to improve the key impeller parts that cause fish damage and death, and has a limited protective effect for fish. Patent Application No. ZL 201310648007.X proposes a flow channel type fish pump. This patent uses a flow channel type impeller to ensure a low damage rate of the conveyed fish at a low rotating speed, and can be widely used to transport soft solids of a certain size without damage. In addition, the axial adjustable connection between the bearing housing and the bracket ensures that requirements for clearance control can be met during assembly, to prevent occurrence of leakage at the clearance leakage to affect the efficiency. Such a flow channel type pump is suitable for use in the field of non-clogging pumps, and is mainly used to convey a medium containing solid particles. However, the low flow rate, low efficiency, and poor stability make it difficult to apply such a flow channel type pump in large-scale water conservancy projects. Patent Applications No. ZL201210385110.5 entitled "Combined Jet Fish Pump", No. ZL201310630367.7 entitled "Siphon Fish Pump and Working Method Thereof", No. ZL202010019665.2 entitled "Vacuum Fish Suction Machine", No. ZL201510477972.4 entitled "Live Fish Conveying Pump and Control Method Thereof", and No. ZL201610913329.6 entitled "Vacuum Fish Pump Floating on Water" all use a volume change or negative pressure to convey a fish-containing medium. Power devices involved in these patents do not include any blade, or there is not blade in the flow channel that fish passes through. These patents are fluid machinery specially used to convey fish and cannot be used in large-scale water conservancy projects.

SUMMARY

To overcome the drawbacks in the prior art, the present disclosure provides a fish guide device for a pump, and an axial flow pump/tubular flow pump station. A plurality of jet holes are arranged on a fish guide ring to guide fish to a fish guide cap by forming a jet. A plurality of fish guide grooves are provided on a surface of the fish guide cap to allow the fish to enter a flow channel of the axial flow pump. The fish guide device can be mounted and used in the abundant fishing season to improve the survival rate of fish, and the fish guide ring can be removed in the scarce fishing season to ensure the hydraulic performance.

The above technical object of the present disclosure is attained with the following technical means.

A fish guide device for a pump is provided, where an axial flow pump blade is located in a runner chamber, a fish guide ring mounted on a wall surface of the runner chamber is arranged at an inlet of the axial flow pump blade, and a fish guide cap is mounted on a hub of the axial flow pump blade; a plurality of jet holes are provided on the fish guide ring, to form a jet to guide fish to the fish guide cap; and a plurality of fish guide grooves are provided on a surface of the fish guide cap to allow the fish to enter a flow channel of the axial flow pump. This can improve the survival rate of fish and allow the fish to smoothly pass through an axial flow pump.

Further, the fish guide ring includes an upstream surface and a downstream surface, where an end of the upstream surface is tangent to the wall surface of the runner chamber, an other end of the upstream surface intersects with the downstream surface, and the plurality of jet holes tapering in a flow direction are provided between the upstream surface and the downstream surface. In this way, the fish near an impeller edge side is guided by the jet. The closer the fish is to the impeller edge, the greater the guiding force of the jet is received by the fish.

Further, a cross-sectional profile of the downstream surface is a straight line, to uniformly increase an area of a flow cross-section at the downstream surface in the flow direction. This ensures a stable water flow and low loss.

Further, an angle $\beta1$ formed between the cross-sectional profile of the downstream surface and a profile of the runner chamber ranges from $3°$ to $5°$.

Further, a cross-sectional profile of the upstream surface is a smooth curve, to smoothly guide the fish. The fish on the impeller edge side is guided by the smooth curved surface, to avoid fish damage.

Further, a tangent line on an inner side of the cross-sectional profile of the upstream surface forms an acute angle $\beta2$ with a rotation axis.

Further, the other end of the upstream surface intersects with the downstream surface to form an intersection line K, and a circular arc transition is provided at the intersection line K; and a radius at the intersection line K is defined as R2, a radius of the runner chamber is defined as R1, and $R2/R1 \geq 0.9$.

Further, an axis of each of the plurality of jet holes is a curve, and a tangent line at an entrance end point at which the curve intersects with the upstream surface is parallel to the wall surface of the runner chamber; and a tangent line at an exit end point at which the curve intersects with the downstream surface forms an angle $\beta3$ with the rotation axis, and $\beta3 < \beta2$.

Further, a cross-sectional diameter of each of the plurality of jet holes on the upstream surface is defined as $d1$, a cross-sectional diameter of each of the plurality of jet holes on the downstream surface is defined as $d2$, and a value of $d1/d2$ satisfies: $2 \leq d1/d2 \leq 4$.

Further, the cross-sectional diameter $d1$ of each of the plurality of jet holes on the upstream surface satisfies the following requirement: $0.5(R1-R2) \leq d1 \leq 0.8(R1-R2)$.

Further, the plurality of jet holes are uniformly arranged on the fish guide ring in a circumferential direction, and a number of the plurality of jet holes is 18 to 54.

Further, a positioning ring is arranged on the fish guide ring, and the positioning ring is configured to mount the fish guide ring between the runner chamber and an inlet pipe.

Further, the surface of the fish guide cap is covered with a cushioning flexible material to receive the guided fish, to reduce fish damage caused by impact.

Further, an axial-sectional profile of the fish guide cap is a semi-ellipse, and a length of a long side of the semi-ellipse is defined as F1; a vertical distance between an upstream vertex M of the fish guide cap and an intersection line K is defined as L1, a distance between a rear edge of the fish guide cap and the intersection line K is defined as L2, and the intersection line K is an intersection line between an upstream surface and a downstream surface of the fish guide ring; and a mounting position of the fish guide cap satisfies: $F1=L2-L1$, $R2/\tan(\beta2)>L1$, and $L2>R3/\tan(\beta3)$, where $\beta3$ is an angle between a rotation axis and a tangent line at an exit end point at which an axis of each of the plurality of jet holes intersects with the downstream surface of the fish guide ring; R3 is a distance from the exit end point of each of the plurality of jet holes to the rotation axis; $\beta2$ is an angle between the rotation axis and a tangent line on an inner side of a cross-sectional profile of the upstream surface of the fish guide ring; and R2 is a radius at the intersection line K.

Further, an axis of each of the plurality of fish guide grooves is parallel to a rotation axis.

Further, an axis of each of the plurality of fish guide grooves forms an angle $\alpha1$ with a rotation axis, and $\alpha1<\alpha2$, where $\alpha2$ is a placement angle of the axial flow pump blade.

Further, a cross-section of each of the plurality of fish guide grooves is in a spindle-like shape formed by two symmetrical circular arcs.

Further, left and right sides of an axis of each of the plurality of fish guide grooves are connected to the surface of the fish guide cap, a cross-section of each of the plurality of fish guide grooves converges along the axis of each of the plurality of fish guide grooves to a front end point Q1 and a rear end point Q2, respectively, and the front end point is located upstream the rear end point; and the rear end point Q2 of each of the plurality of fish guide grooves coincides with the rear edge of the fish guide cap, and a straight-line distance from the front end point of each of the plurality of fish guide grooves to the rotation axis is set to $0.1*F2$ to $0.3*F2$, where F2 is a length of a short side of the semi-ellipse.

Further, a number of the plurality of fish guide grooves provided on the surface of the fish guide cap is 1 to 2 times a number of the axial flow pump blade.

Further, the plurality of fish guide grooves on the surface of the fish guide cap are staggered from the axial flow pump blade.

The advantages of the present disclosure are as follows.

1. In the fish guide device for a pump according to the present disclosure, a plurality of jet holes are arranged on the fish guide ring to guide fish to the fish guide cap by forming a jet. A plurality of fish guide grooves are provided on the surface of the fish guide cap to allow the fish to enter the flow channel of the axial flow pump. The fish guide device can be mounted and used in the abundant fishing season to improve the survival rate of fish, and the fish guide ring can be removed in the scarce fishing season to ensure the hydraulic performance.

2. In the fish guide device for a pump according to the present disclosure, the cross-sectional area of the downstream surface changes linearly and diffuses uniformly, ensuring a stable water flow and low loss. The upstream surface is a curved surface, and the fish on the impeller edge side is guided by the smooth curved surface. The jet hole is a tapered through hole to form a jet, and the fish near the impeller edge side is guided by the jet. The closer the fish is to the impeller edge, the greater the guiding force of the jet is received by the fish. Under the joint action of the upstream surface and the jet hole, the fish is guided to the side close to the hub to reduce the possibility of the fish being stuck into the tip clearance, and the fish will contact with the downstream fish guide cap.

3. In the fish guide device for a pump according to the present disclosure, the surface of the fish guide cap is covered with the flexible material to receive the guided fish, to reduce fish damage caused by impact. The plurality of fish guide grooves on the surface of the fish guide cap provide a channel for movement of the fish to avoid impact by the front edge of the blade.

BRIEF DESCRIPTION OF THE DRAWINGS

In order to more clearly explain the technical solutions in the embodiments of the present disclosure or in the prior art, the drawings used in the description of the embodiments or the prior art will be briefly described below. Obviously, the drawings depicted below are merely embodiments of the present disclosure, and those skilled in the art can obtain other drawings based on these drawings without any creative efforts.

In the drawings.

Figure 1:
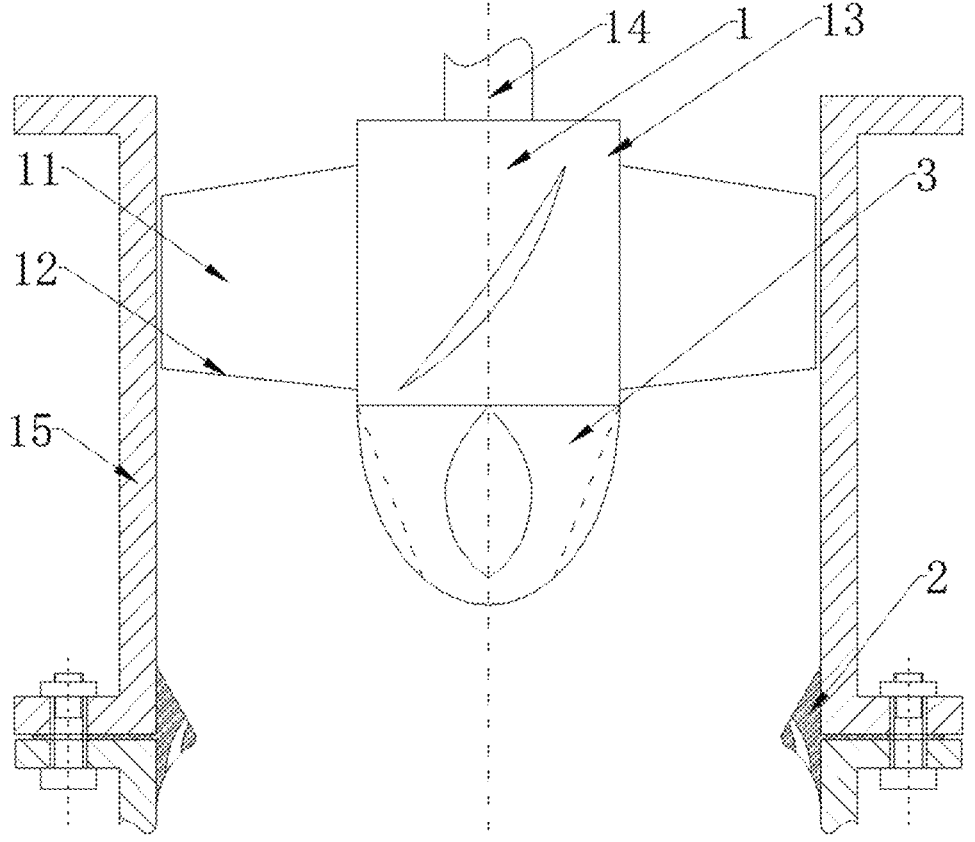
FIG. 1 is a diagram of a fish guide device for a pump according to the present disclosure.

1—axial flow pump; 11—axial flow pump blade; 12—front blade edge; 13—hub; 14—rotation axis; 15—runner chamber; 2—fish guide ring; 21—upstream surface; 22—downstream surface; 23—jet hole; 24—positioning ring; 25—positioning through hole; 26—positioning bolt; 3—fish guide cap; 31—fish guide groove.

DETAILED DESCRIPTION OF THE EMBODIMENTS

Embodiments of the present disclosure will be described in detail hereinafter with reference to accompanying drawings in which the same or like reference characters refer to the same or like elements or elements having the same or like functions throughout. The embodiments described below with reference to accompanying drawings are exemplary, and intended to explain, instead of limiting the present disclosure.

In the description of the present disclosure, it should be understood that the orientation or positional relationships indicated by the terms "center", "longitudinal", "transverse", "length", "width", "thickness", "upper", "lower", "axial", "radial", "vertical", "horizontal", "inner", "outer", etc. are based on the orientation or positional relationships shown in the drawings, and are only for the convenience of describing the present disclosure and simplifying the description, rather than indicating or implying that the apparatus or element described must have a specific orientation or be constructed and operated in a specific orientation, and therefore are not to be construed as limiting the present disclosure. Moreover, the terms "first" and "second" are used herein for purposes of description, and are not intended to indicate or imply relative importance or implicitly point out the number of the indicated technical feature. Therefore, the features defined by "first" and "second" may explicitly or implicitly include one or more features. In the description of the present disclosure, "plural" means two or more, unless it is defined otherwise specifically.

In the present disclosure, unless otherwise clearly specified and defined, the terms "mount", "connect", "couple", "fix" and variants thereof should be interpreted in a broad sense, for example, may be a fixed connection, a detachable connection, or an integral connection; may be a mechanical connection or an electrical connection; or may be a direct connection, an indirectly connection via an intermediate medium, or communication between the interiors of two components. For those of ordinary skill in the art, the specific meanings of the above terms in the present disclosure can be understood according to specific circumstances.

As shown in FIG. 1, the present disclosure provides a fish guide device for a pump, where an axial flow pump 1 is a rotating structure including an axial flow pump blade 11, an axial flow pump hub 13, and a rotating shaft 14. An inlet side of the axial flow pump blade 11 is a front blade edge 12. A stationary cavity surrounding the axial flow pump 1 is a runner chamber 15. The axial flow pump blade 11 is located in the runner chamber 15. A fish guide ring 2 mounted on a wall surface of the runner chamber 15 is arranged at an inlet of the axial flow pump blade 11. For the convenience of disassembly, the fish guide ring 2 is generally mounted between the runner chamber 15 and an inlet channel flange. A fish guide cap 3 is mounted on the hub 13 of the axial flow pump blade 11. A plurality of jet holes 23 are provided on the fish guide ring 2, to form a jet to guide fish to the fish guide cap 3. A plurality of fish guide grooves 31 with smooth transition are provided on a surface of the fish guide cap 3 to allow the fish to enter a flow channel of the axial flow pump 1. The fish guide ring 2 can guide fish in an incoming water flow to the fish guide cap 3, and then the fish enters the flow channel of the axial flow pump 1 through the fish guide grooves 31, to prevent the fish from being cut by the front blade edge 12. The fish guide ring 2 and the fish guide cap 3 are mounted during the abundant fishing season to cooperate with each other to reduce fish damage, and can be removed or replaced during the scarce fishing season.

Figure 2:
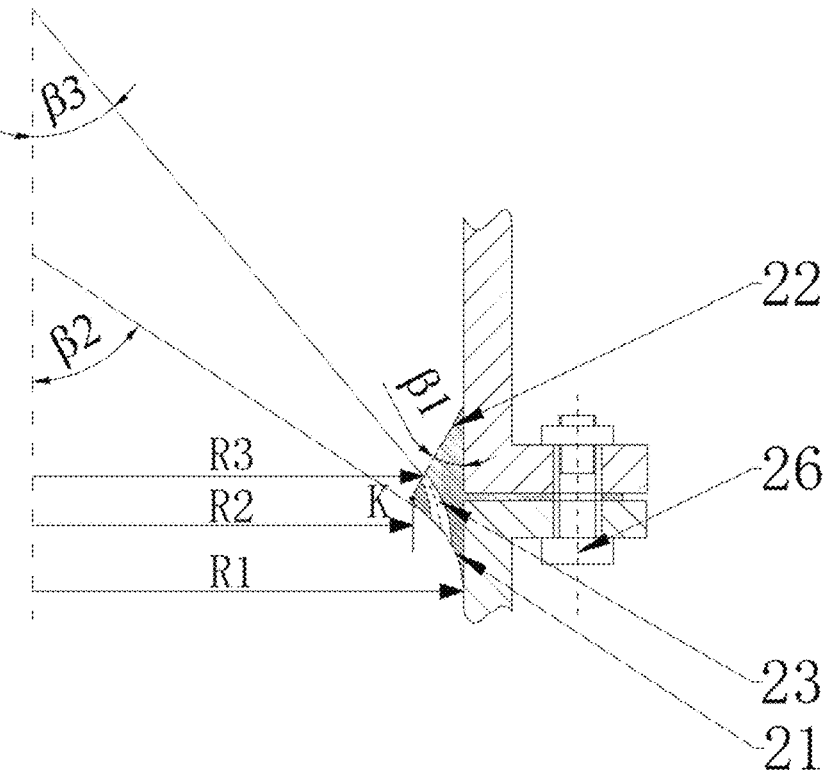
FIG. 2 is a schematic diagram of an axial section of a fish guide ring according to the present disclosure.
Figure 3:
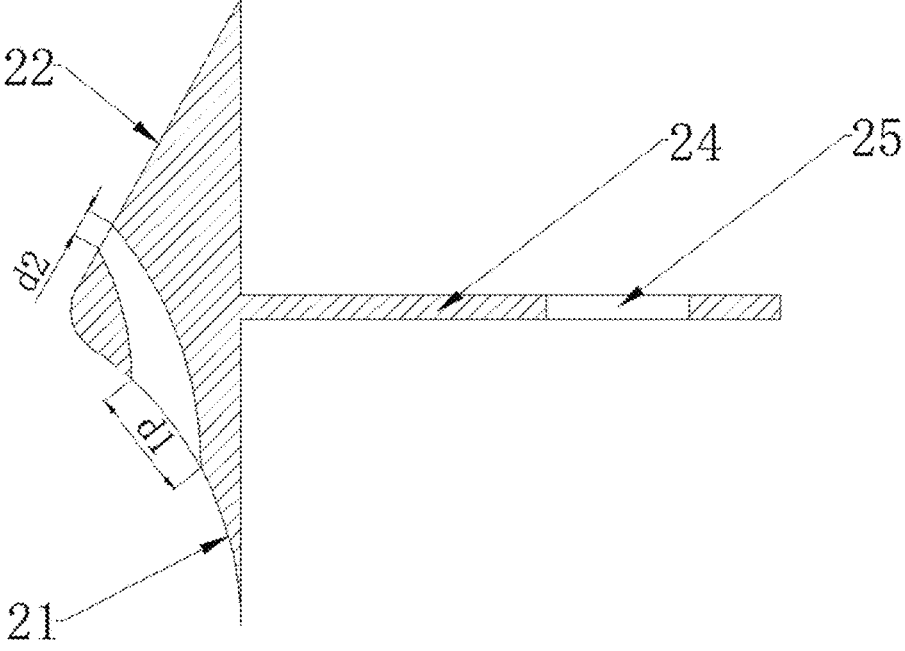
FIG. 3 is a schematic diagram of a jet hole according to the present disclosure.

As shown in FIG. 2 and FIG. 3, the fish guide ring 2 includes an upstream surface 21 and a downstream surface 22. An end of the upstream surface 21 is tangent to the wall surface of the runner chamber 15. An other end of the upstream surface 21 intersects with the downstream surface 22. A plurality of jet holes 23 tapering in a flow direction are provided between the upstream surface 21 and the downstream surface 22. A cross-sectional profile of the upstream surface 21 is a smooth curve, to smoothly guide the fish. A tangent line on an inner side of the cross-sectional profile of the upstream surface 21 forms an angle $\beta 2$ with a rotation axis 14. $\beta 2$ is an acute angle. A cross-sectional profile of the downstream surface 22 is a straight line, to uniformly increase an area of a flow cross-section at the downstream surface 22 in the flow direction. An angle $\beta 1$ formed between the cross-sectional profile of the downstream surface 22 and a profile of the runner chamber 15 ranges from 3° to 5°. In this way, the area of the flow cross-section at the downstream surface 22 changes linearly and uniformly, and reasonable liquid flow diffusion is ensured. The other end of the upstream surface 21 intersects with the downstream surface 22 to form an intersection line K, and a circular arc transition is provided at the intersection line K. A radius at the intersection line K is defined as R2, a radius of the runner chamber 15 is defined as R1, and R2/R1>0.9. In this way, the hydraulic loss can be reduced.

An axis of the jet hole 23 is a curve, and a tangent line at an entrance end point at which the curve intersects with the upstream surface 21 is parallel to the wall surface of the runner chamber 15. A tangent line at an exit end point at which the curve intersects with the downstream surface 22 forms an angle $\beta 3$ with the rotation axis 14, a distance from the exit end point to the rotation axis 14 is defined as R3, and generally $\beta 3 < \beta 2$.

As shown in FIG. 3, a cross-sectional diameter of the jet hole 23 on the upstream surface 21 is defined as d1, a cross-sectional diameter of the jet hole 23 on the downstream surface 22 is defined as d2, and a value of d1/d2 satisfies: 2≤d1/d2≤4. When there is a large amount of fish in the incoming water flow, d1/d2 may be set to a large value, to form a strong jet to guide the fish. When there is a small amount of fish in the incoming water flow, d1/d2 may be set to a small value, to form a weak jet to guide the fish.

To ensure that the fish guide ring 2 has a certain strength after the formation of the jet holes 23 and ensure that the jet holes 23 have a certain flow capacity and are not easily clogged, the cross-sectional diameter d1 of the jet hole 23 on the upstream surface 21 meets the following requirement: 0.5(R1−R2)≤d1≤0.8(R1−R2). When there is a large amount of fish in the incoming water flow, d1 may be set to a large value. When there is a small amount of fish in the incoming water flow, d1 may be set to a small value.

Figure 4:
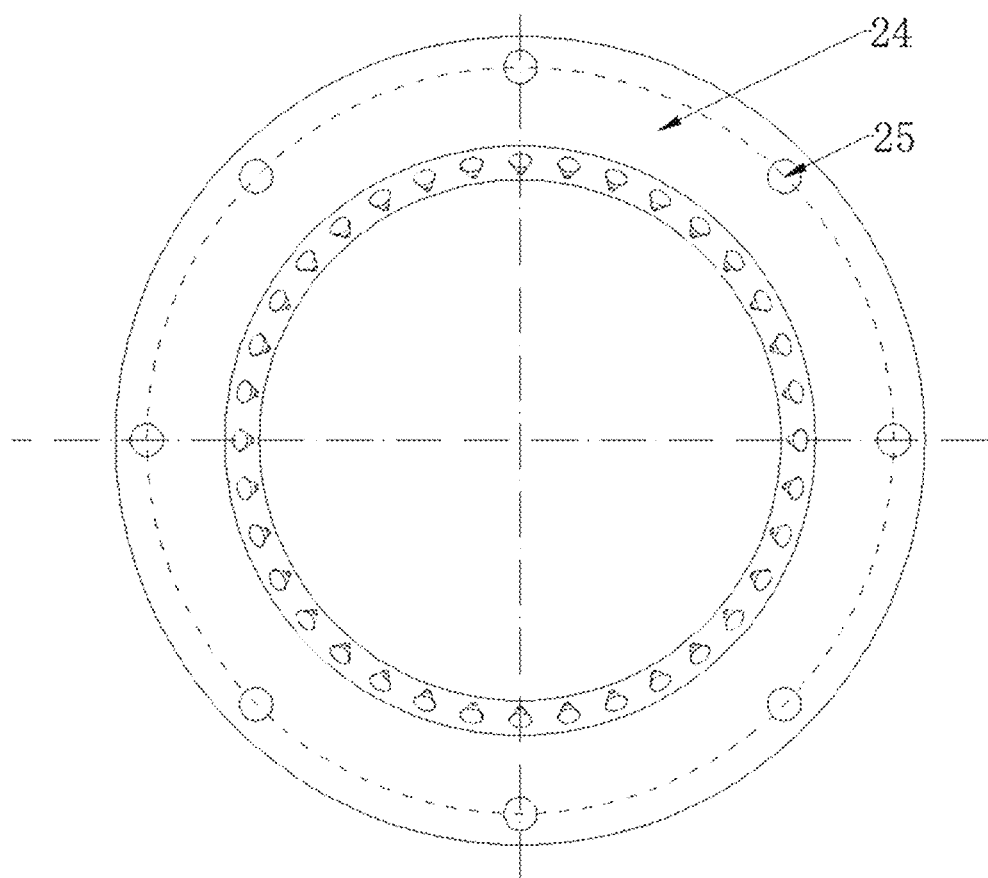
FIG. 4 is a top view of the fish guide ring according to the present disclosure.

As shown in FIG. 3 and FIG. 4, the plurality of jet holes 23 are uniformly arranged on the fish guide ring 2 in a circumferential direction, and a number of the jet holes 23 is 18 to 54. A positioning ring 24 is arranged on the fish guide ring 2. The positioning ring 24 is configured to mount the fish guide ring 2 between the runner chamber 15 and an inlet pipe. The positioning ring 24 provides positioning for the fish guide ring 2, is in the shape of a circular ring, and has a certain thickness and strength. An inner side of the positioning ring 24 is connected to a main structure of the fish guide ring 2. A plurality of positioning through holes 25 are provided on an outer side of the positioning ring 24. Positioning bolts 26 between a flange of the runner chamber 15 and the inlet channel flange respectively pass through positioning through holes 25. Mounting, positioning, and removal of the fish guide ring 2 are realized through positioning bolts 26.

Figure 5:
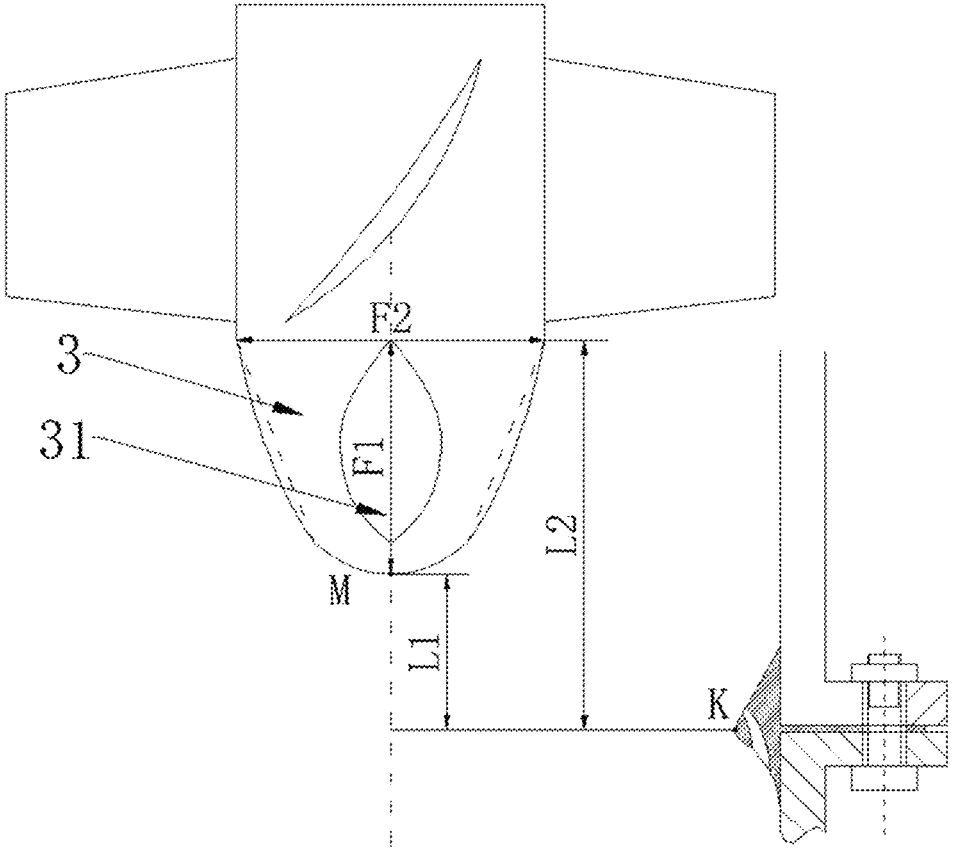
FIG. 5 is a schematic diagram of a fish guide cap according to the present disclosure.

As shown in FIG. 5, the surface of the fish guide cap 3 is covered with a cushioning flexible material. The fish guide cap 3 is mounted on the axial flow pump 1 and maintains the same rotating speed as the rotating shaft 14. Because the fish guided from the fish guide ring 2 to the fish guide cap 3 may be impacted by the surface of the fish guide cap 3, the surface of the fish guide cap 3 is covered with the cushioning flexible material such as rubber, to reduce fish damage caused by impact. An axial-sectional profile of the fish guide cap 3 is a semi-ellipse. A length of a long side of the semi-ellipse is defined as F1. A length of a short side of the semi-ellipse is defined as F2. A vertical distance between an upstream vertex M of the fish guide cap 3 and an intersection line K is defined as L1, a distance between a rear edge of the fish guide cap 3 and the intersection line K is defined as L2, and the intersection line K is an intersection line between the upstream surface 21 and the downstream surface 22 of the fish guide ring 2.

To ensure that the fish can contact with the fish guide cap 3 after being guided by the fish guide ring 2, a mounting position of the fish guide cap 3 satisfies: F1=L2−L1, R2/tan ($\beta 2$)>L1, and L2>R3/tan($\beta 3$), where $\beta 3$ is the angle between the rotation axis 14 and the tangent line at the exit end point at which the axis of the jet hole 23 intersects with the downstream surface 22 of the fish guide ring 2; R3 is the distance from the exit end point of the jet hole 23 to the rotation axis 14; $\beta 2$ is the angle between the rotation axis 14 and the tangent line on the inner side of the cross-sectional profile of the upstream surface 21 of the fish guide ring 2; and R2 is the radius at the intersection line K.

Figure 6:
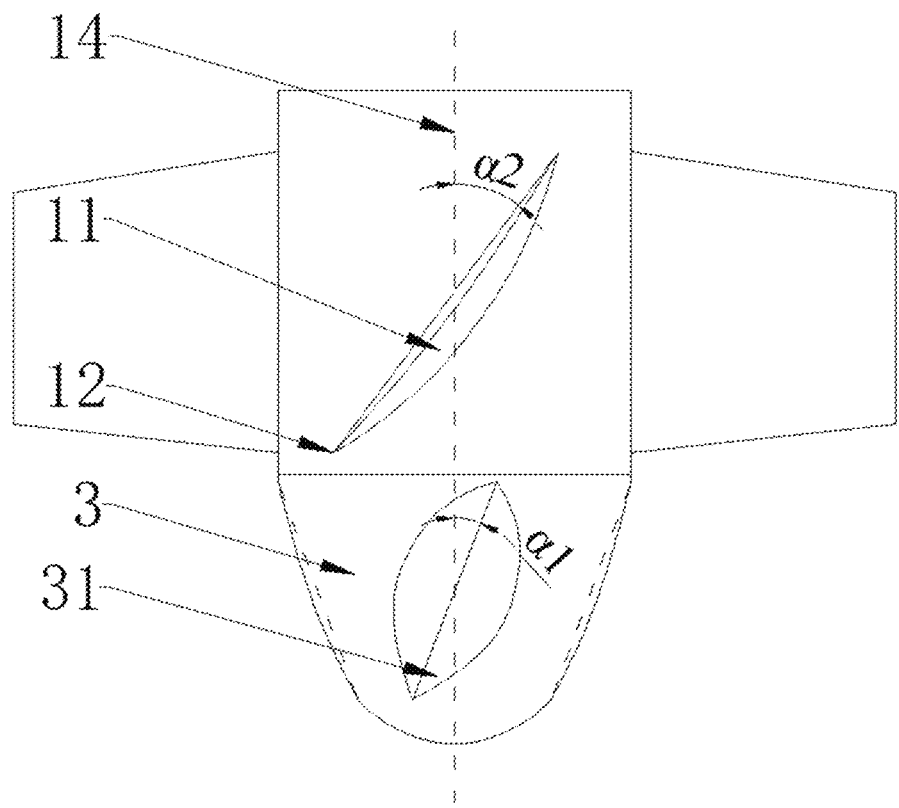
FIG. 6 is a schematic mounting diagram of a fish guide groove according to the present disclosure.

As shown in FIG. 6, the fish guide grooves 31 with smooth transition are provided on the surface of the fish guide cap 3, and an axis of the fish guide groove 31 may be parallel to the rotation axis 14. The axis of the fish guide groove 31 may form an angle $\alpha 1$ with the rotation axis 14, and $\alpha 1 < \alpha 2$, where $\alpha 2$ is a placement angle of the axial flow pump blade 11. In this way, it is ensured that the fish guided by the fish guide groove 31 will not be impacted by the front blade edge 12.

Figure 7:
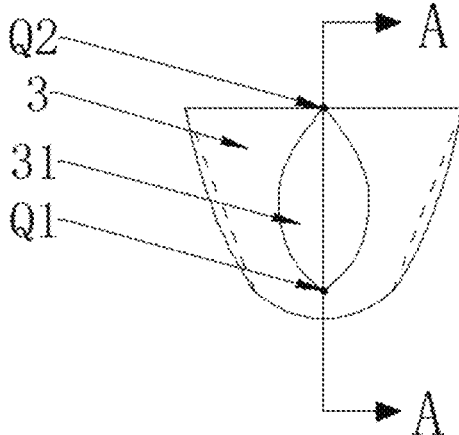
FIG. 7 is a schematic diagram of a fish guide groove according to the present disclosure.
Figure 8:
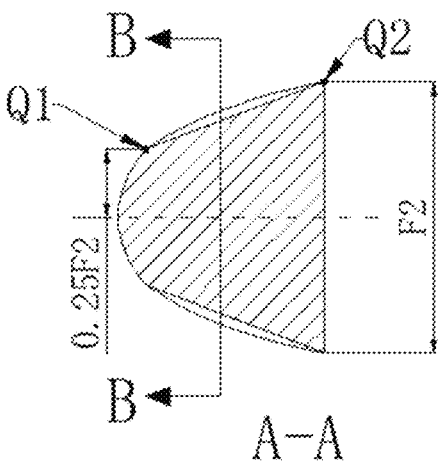
FIG. 8 is a cross-sectional view of FIG. 7 taken along line A-A.
Figure 9:
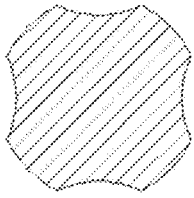
FIG. 9 is a cross-sectional view of FIG. 8 taken along line B-B.
Figure 10:
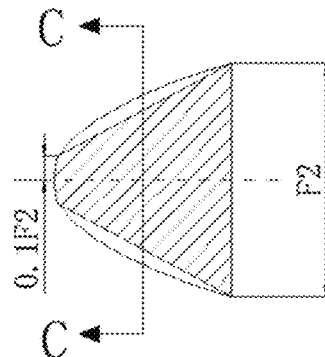
FIG. 10 is a cross-sectional view of another embodiment of a fish guide groove according to the present disclosure.
Figure 11:
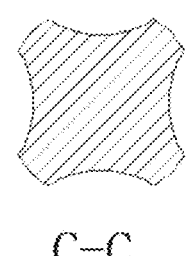
FIG. 11 is a cross-sectional view of FIG. 10 taken along line C-C.

As shown in FIG. 7 and FIG. 8, a cross-section of the fish guide groove 31 is in a spindle-like shape formed by two symmetrical circular arcs. As shown in FIG. 9 and FIG. 11, left and right sides of an axis of the fish guide groove 31 are connected to the surface of the fish guide cap 3, the cross-section of the fish guide groove 31 converges along the axis of the fish guide groove 31 to a front end point Q1 and a rear end point Q2, respectively, and the front end point is located upstream the rear end point. The relative positions of the two end points determine a depth of the fish guide groove 31, i.e., as the end point Q1 is moved upstream, the depth of the fish guide groove 31 increases. The rear end point Q2 of the fish guide groove 31 coincides with the rear edge of the fish guide cap 3, i.e., a straight-line distance from the rear end point Q2 to the rotation axis 14 is equal to a radius of the hub, which is 0.5*F2. A straight-line distance from the front end point of the fish guide groove 31 to the rotation axis 14 is set to 0.1*F2 to 0.3*F2, where F2 is the length of the short side of the semi-ellipse. When there is a large amount of fish in the incoming water flow, the straight-line distance from the front end point of the fish guide groove 31 to the rotation axis 14 may be set to 0.1*F2 to increase the depth of the fish guide groove, and when there is a small amount of fish in the incoming water flow, the straight-line distance from the front end point of the fish guide groove 31 to the rotation axis 14 may be set to 0.3*F2 to decrease the depth of the fish guide groove, as shown in FIG. 8 and FIG. 10.

A number of the fish guide grooves 31 provided on the surface of the fish guide cap 3 is 1 to 2 times a number of the axial flow pump blades 11. Generally speaking, the number of the fish guide grooves 31 is usually the same as the number of the axial flow pump blades 11, and may be 2 to 4. When there is a large amount of fish in the incoming water flow, the number of the fish guide grooves 31 may be set to be twice the number of the axial flow pump blades 11.

Figure 12:
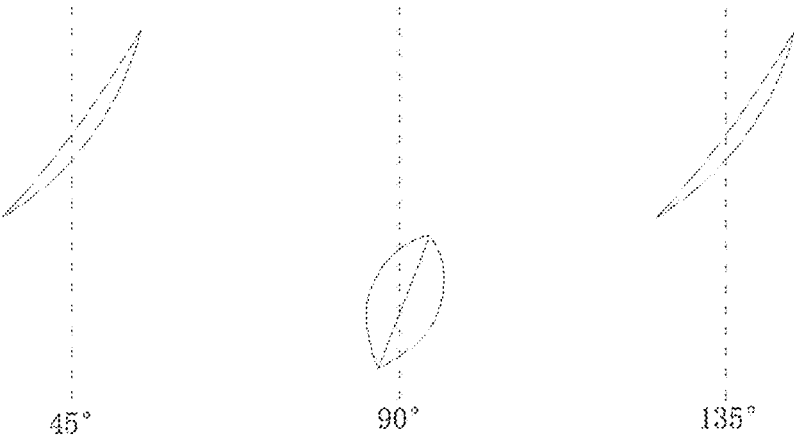
FIG. 12 is a schematic expansion diagram of a cylindrical surface of four blades and four fish guide grooves.
Figure 13:
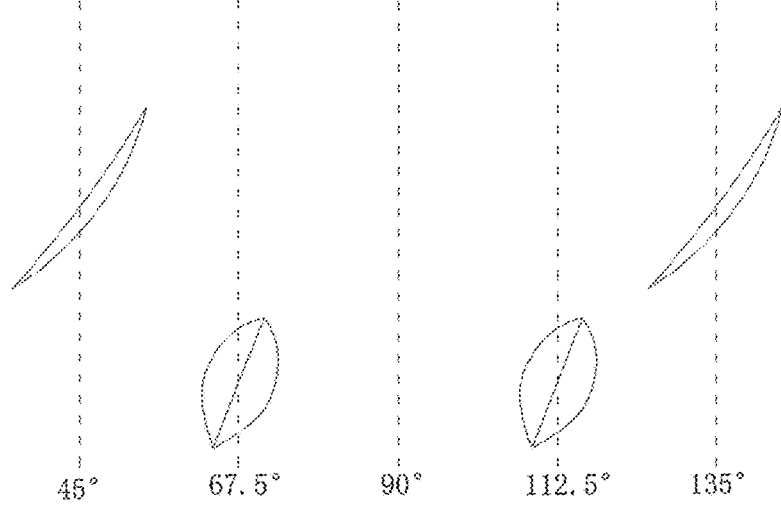
FIG. 13 is a schematic expansion diagram of a cylindrical surface of four blades and eight fish guide grooves.

As shown in FIG. 12, the fish guide groove 31 on the surface of the fish guide cap 3 is staggered from the axial flow pump blades 11. In other words, there is a certain phase angle difference between the blade 11 and the fish guide groove 31. Using a four-blade impeller as an example, the blades 11 are placed at 45 degrees, 135 degrees, 225 degrees, and 315 degrees (or i degrees, i+90 degrees, i+180 degrees, and i+270 degrees, i.e., the blades are separated from each other by 90 degrees). If the number of fish guide grooves 31 is four, the fish guide grooves are formed at positions corresponding to 0 degrees, 90 degrees, 180 degrees, and 270 degrees (or i−45 degrees, i+45 degrees, i+135 degrees, and i+225 degrees, i.e., the fish guide grooves are separated from each other by 90 degrees, and are separated from the blades by 45 degrees). If the number of fish guide grooves 31 is eight, the fish guide grooves are formed at positions corresponding to 22.5 degrees, 67.5 degrees, 112.5 degrees, 157.5 degrees, 202.5 degrees, 247.5 degrees, 292.5 degrees, and 337.5 degrees (or i−22.5 degrees, i+22.5 degrees, i+67.5 degrees, i+112.5 degrees, i+157.5 degrees, i+202.5 degrees, i+247.5 degrees, and i+292.5 degrees, i.e., the fish guide grooves are separated from each other by 45 degrees, and are separated from the blades by 22.5 degrees), as shown in FIG. 13.

Generally speaking, different models of fish guide rings 2 and fish guide caps 3 may be designed by changing geometric parameters, and the model of the fish guide ring 2 and the model of the fish guide cap 3 may be selected if the axial flow pump mounting space, fish density in the incoming water flow, fish size, etc. are known under specific usage occasions, to ensure that the fish is guided to the fish guide cap 3 under the action of the fish guide ring 2. The fish guide cap 3 is usually used in combination with the fish guide ring 2 to receive the fish guided thereto, so that the fish impact probability and impact damage can be maintained at a low level. The fish guide ring 2 may be used in combination with the fish guide cap 3, or may be used alone. When the fish guide ring is used alone, the fish is only guided to the hub side to pass through the axial flow pump blade 11, and the protection effect is not as good as that obtained when the fish guide ring is used in combination with the fish guide cap.

Figure 14:
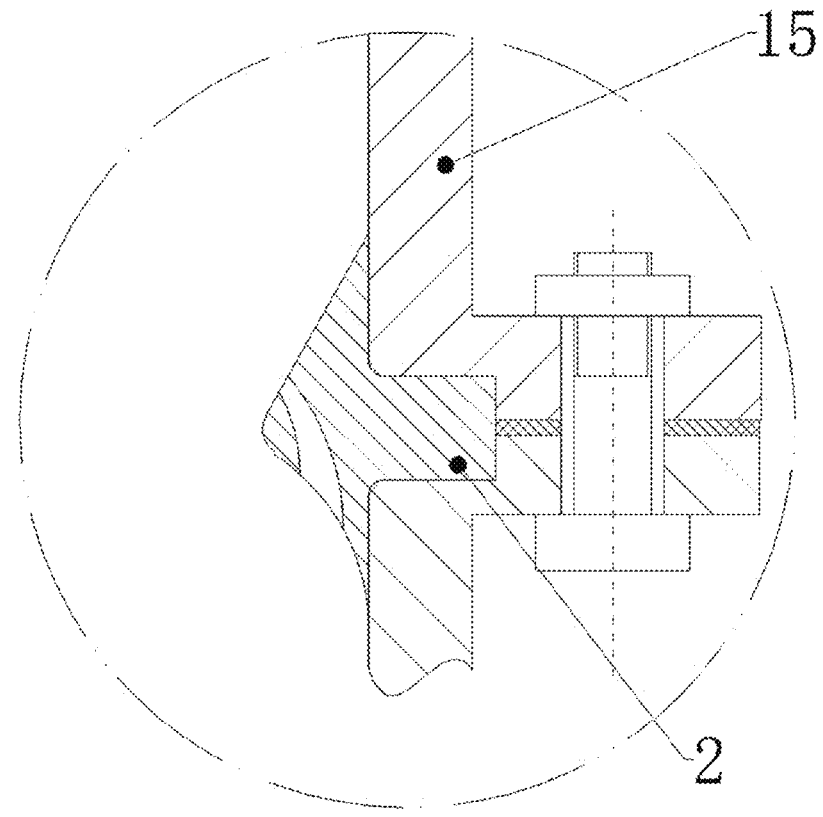
FIG. 14 is a structural diagram of another embodiment of a fish guide ring according to the present disclosure.

FIG. 14 shows another embodiment of the fish guide ring 2. A positioning protrusion is arranged on the fish guide ring 2. The flange of the runner chamber 15 and a flange of the inlet pipe are each provided with a mounting groove. The positioning protrusion is sandwiched between the mounting grooves on the runner chamber 15 and the inlet pipe, and then the fish guide ring 2 is tightly clamped by the bolts between the flange of the runner chamber 15 and the flange of the inlet pipe. A seal ring may be arranged on the positioning protrusion for sealing.

Figure 15:
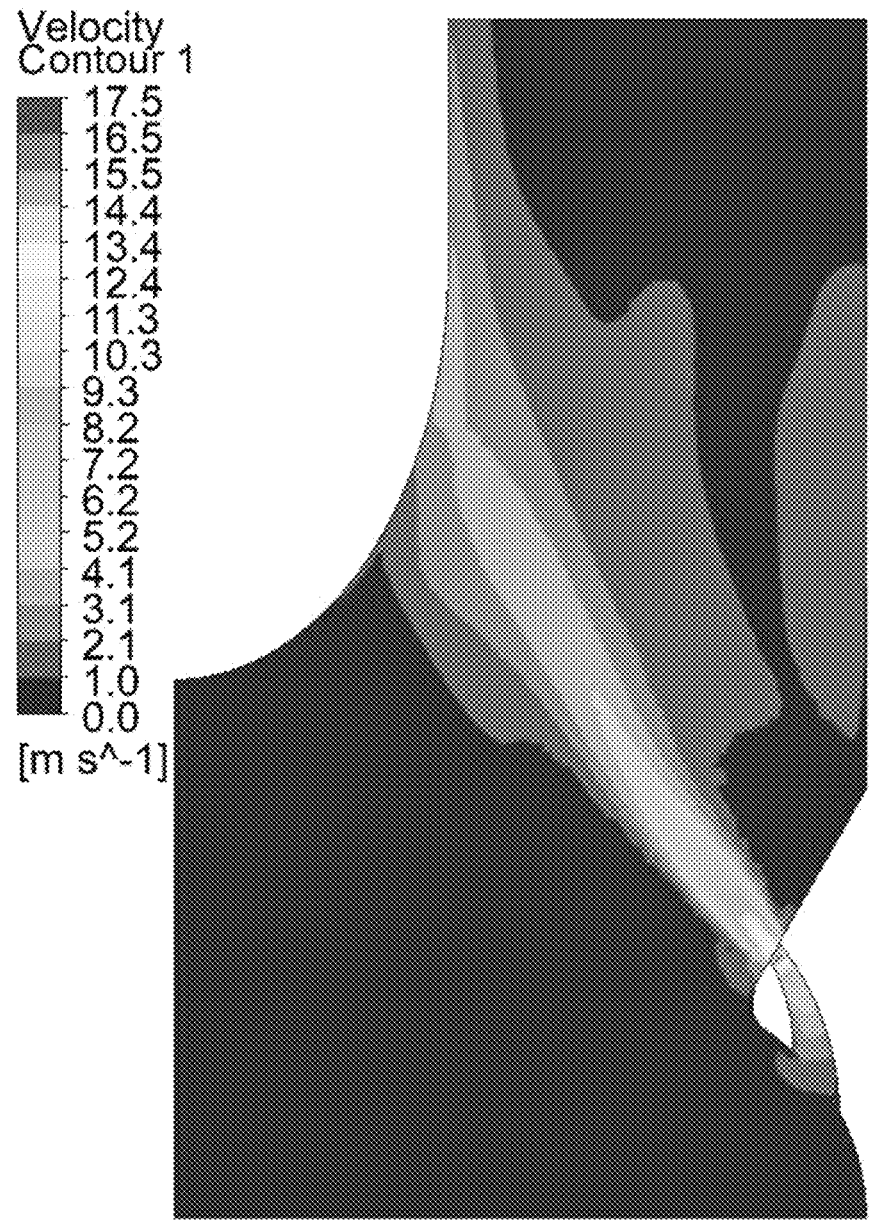
FIG. 15 is a simulation diagram of a jet formed by the fish guide ring according to the present disclosure.

As shown in FIG. 15, it can be seen from the simulation diagram of a jet formed by the fish guide ring 2 of the present disclosure that under the joint action of the upstream surface 21 and the jet hole 23, a jet is formed on the downstream surface 22, and the acting force of the jet guides the fish to the side close to the hub 13, to reduce the possibility of the fish being stuck into the tip clearance. The jet hole 23 faces toward the fish guide cap, so that the fish will contact with the downstream fish guide cap. The cross-sectional area of the downstream surface 22 changes linearly and diffuses uniformly, ensuring a stable water flow and low loss.

An axial flow pump/tubular flow pump station is provided. The fish guide device is removably mounted in the axial flow pump/tubular flow pump station.

It should be understood that although this specification is described in accordance with various embodiments, it does not mean that each embodiment only contains an independent technical solution. The description in the specification is only for clarity, and those skilled in the art should regard the specification as a whole, and the technical solutions in the embodiments can also be appropriately combined to form other implementations that can be understood by those skilled in the art.

The detailed descriptions listed above are merely specific illustrations of feasible embodiments of the present disclosure, and the protection scope of the present disclosure is not limited thereto. Equivalent embodiments or changes can be made without departing from the technical spirit of the present disclosure, which are all embraced in the protection scope of the present disclosure.

What is claimed is:

1. A fish guide device for a pump, wherein an axial flow pump blade is located in a runner chamber, wherein, a fish guide ring mounted on a wall surface of the runner chamber is arranged at an inlet of the axial flow pump blade, and a fish guide cap is mounted on a hub of the axial flow pump blade; a plurality of jet holes are provided on the fish guide ring, to form a jet to guide fish to the fish guide cap; and a plurality of fish guide grooves are provided on a surface of the fish guide cap to allow the fish to enter a flow channel of an axial flow pump.

2. The fish guide device for the pump according to claim 1, wherein, the fish guide ring comprises an upstream surface and a downstream surface, wherein an end of the upstream surface is tangent to the wall surface of the runner chamber, an other end of the upstream surface intersects with the downstream surface, and the plurality of jet holes tapering in a flow direction are provided between the upstream surface and the downstream surface.

3. The fish guide device for the pump according to claim 2, wherein, a cross-sectional profile of the downstream surface is a straight line, to uniformly increase an area of a flow cross-section at the downstream surface in the flow direction.

4. The fish guide device for the pump according to claim 3, wherein, an angle $\beta1$ formed between the cross-sectional profile of the downstream surface and a profile of the runner chamber ranges from 3° to 5°.

5. The fish guide device for the pump according to claim 2, wherein, a cross-sectional profile of the upstream surface is a smooth curve, to smoothly guide the fish.

6. The fish guide device for the pump according to claim 5, wherein, a tangent line on an inner side of the cross-sectional profile of the upstream surface forms an acute angle $\beta2$ with a rotation axis.

7. The fish guide device for the pump according to claim 2, wherein, the other end of the upstream surface intersects with the downstream surface to form an intersection line K, and a circular arc transition is provided at the intersection line K; and a radius at the intersection line K is defined as R2, a radius of the runner chamber is defined as R1, and $R2/R1 \geq 0.9$.

8. The fish guide device for the pump according to claim 6, wherein, an axis of each of the plurality of jet holes is a curve, and a tangent line at an entrance end point at which the curve intersects with the upstream surface is parallel to the wall surface of the runner chamber; and a tangent line at an exit end point at which the curve intersects with the downstream surface forms an angle $\beta3$ with the rotation axis, and $\beta3 < \beta2$.

9. The fish guide device for the pump according to claim 2, wherein, a cross-sectional diameter of each of the plurality of jet holes on the upstream surface is defined as $d1$, a cross-sectional diameter of each of the plurality of jet holes on the downstream surface is defined as $d2$, and a value of $d1/d2$ satisfies: $2 \leq d1/d2 \leq 4$.

10. The fish guide device for the pump according to claim 9, wherein, the cross-sectional diameter $d1$ of each of the plurality of jet holes on the upstream surface satisfies the following requirement: $0.5(R1-R2) \leq d1 \leq 0.8(R1-R2)$.

11. The fish guide device for the pump according to claim 2, wherein, the plurality of jet holes are uniformly arranged on the fish guide ring in a circumferential direction, and a number of the plurality of jet holes is 18 to 54.

12. The fish guide device for the pump according to claim 2, wherein, a positioning ring is arranged on the fish guide ring, and the positioning ring is configured to mount the fish guide ring between the runner chamber and an inlet pipe.

13. The fish guide device for the pump according to claim 1, wherein, the surface of the fish guide cap is covered with a cushioning flexible material.

14. The fish guide device for the pump according to claim 1, wherein, an axial-sectional profile of the fish guide cap is a semi-ellipse, and a length of a long side of the semi-ellipse is defined as $F1$; a vertical distance between an upstream vertex M of the fish guide cap and an intersection line K is defined as $L1$, a distance between a rear edge of the fish guide cap and the intersection line K is defined as $L2$, and the intersection line K is an intersection line between an upstream surface and a downstream surface of the fish guide ring; and a mounting position of the fish guide cap satisfies: $F1=L2-L1$, $R2/\tan(\beta2)>L1$, and $L2>R3/\tan(\beta3)$, wherein $\beta3$ is an angle between a rotation axis and a tangent line at an exit end point at which an axis of each of the plurality of jet holes intersects with the downstream surface of the fish guide ring; $R3$ is a distance from the exit end point of each of the plurality of jet holes to the rotation axis; $\beta2$ is an angle between the rotation axis and a tangent line on an inner side of a cross-sectional profile of the upstream surface of the fish guide ring; and $R2$ is a radius at the intersection line K.

15. The fish guide device for the pump according to claim 1, wherein, an axis of each of the plurality of fish guide grooves is parallel to a rotation axis.

16. The fish guide device for the pump according to claim 1, wherein, an axis of each of the plurality of fish guide grooves forms an angle $\alpha1$ with a rotation axis, and $\alpha1<\alpha2$, wherein $\alpha2$ is a placement angle of the axial flow pump blade.

17. The fish guide device for the pump according to claim 1, wherein, a cross-section of each of the plurality of fish guide grooves is in a spindle-like shape formed by two symmetrical circular arcs.

18. The fish guide device for the pump according to claim 14, wherein, left and right sides of an axis of each of the plurality of fish guide grooves are connected to the surface of the fish guide cap, a cross-section of each of the plurality of fish guide grooves converges along the axis of each of the plurality of fish guide grooves to a front end point Q1 and a rear end point Q2, respectively, and the front end point is located upstream the rear end point; and the rear end point Q2 of each of the plurality of fish guide grooves coincides with the rear edge of the fish guide cap, and a straight-line distance from the front end point of each of the plurality of fish guide grooves to the rotation axis is set to $0.1*F2$ to $0.3*F2$, wherein $F2$ is a length of a short side of the semi-ellipse.

19. The fish guide device for the pump according to claim 1, wherein, a number of the plurality of fish guide grooves provided on the surface of the fish guide cap is 1 to 2 times a number of the axial flow pump blade.

20. The fish guide device for the pump according to claim 1, wherein, the plurality of fish guide grooves on the surface of the fish guide cap are staggered from the axial flow pump blade.

21. An axial flow pump/tubular flow pump station, wherein the fish guide device for the pump according to claim 1 is removably mounted in the axial flow pump/tubular flow pump station.

*   *   *   *   *